Figure 1:
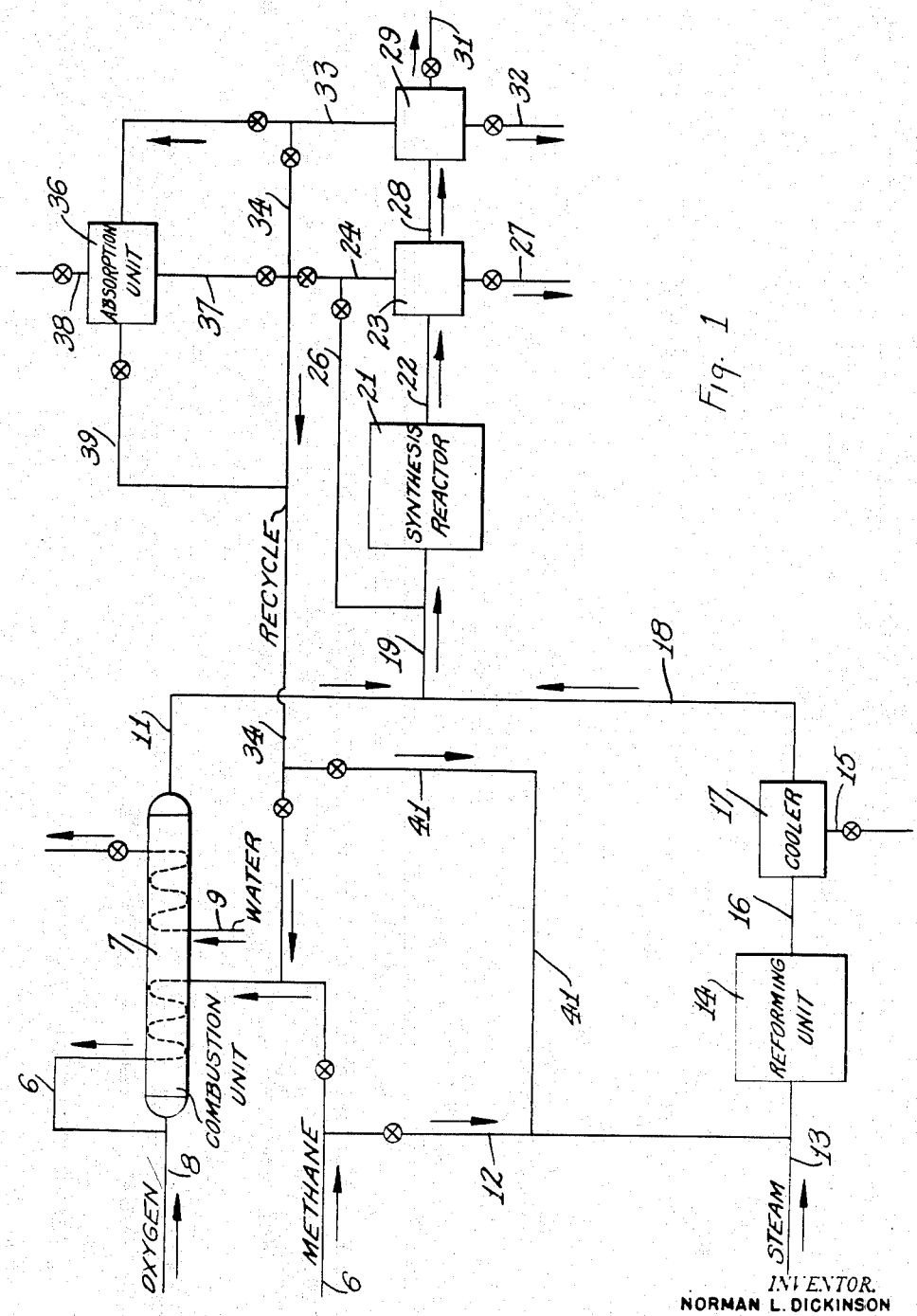

INVENTOR.
NORMAN L. DICKINSON

Patented Aug. 17, 1954

2,686,801

UNITED STATES PATENT OFFICE 2,686,801

SIMULTANEOUS PRODUCTION OF HYDROCARBONS AND OXYGENATED COMPOUNDS

Norman L. Dickinson, Basking Ridge, N. J., assignor to The M. W. Kellogg Company, Jersey City, N. J., a corporation of Delaware Original application September 27, 1947, Serial No. 776,518. Divided and this application March 31, 1950, Serial No. 153,168

9 Claims. (Cl. 260—449.6)

This invention relates to the synthesis of organic compounds. In one aspect this invention relates to the production of a gas rich in hydrogen, useful for the synthesis of organic compounds. In another aspect this invention relates to an integrated process involving the production of hydrogen and an oxide of carbon and the subsequent interaction of the hydrogen and the oxide of carbon in the presence of a hydrogenation catalyst to produce hydrocarbons having more than one carbon atom per molecule and oxygenated organic compounds.

This application is a division of my United States Application Serial No. 776,518, filed September 27, 1947, now abandoned.

It has been known for some time that a gaseous mixture comprising hydrogen and carbon monoxide may be produced either by the partial combustion of relatively low-boiling hydrocarbons, such as methane, or by the reaction of relatively low-boiling hydrocarbons with steam. The partial combustion of methane as well as the reaction of carbon dioxide with methane to produce hydrogen and carbon monoxide produces these components in a relatively low ratio with respect to each other, usually in a mol ratio less than about 2:1 at temperatures between about 1800 and about 2500° F. On the other hand, the production of hydrogen and carbon monoxide by the reaction between methane and steam produces these components in a mol ratio above about 2:1 at a temperature of about 1250 to about 2400° F. Either of the above reactions may be effected with or without a catalyst. The synthesis of hydrocarbons from such gaseous mixtures has been effected in the presence of a catalyst, such as a metal or a metal oxide in Group VIII of the periodic table, to produce organic compounds therefrom. Generally the ratio of hydrogen to carbon monoxide for the synthesis of hydrocarbons is between about 1:1 and about 3:1, preferably a ratio of about 2:1. It is, therefore, desirable to provide a method for producing a synthesis feed having the preferred composition of about 2:1 mol ratio of hydrogen to carbon monoxide.

It is an object of this invention to produce a synthesis gas comprising hydrogen and carbon monoxide in a ratio of about 2:1.

It is another object of this invention to provide a continuous process for the synthesis of organic compounds from relatively low-boiling hydrocarbons.

Still another object of this invention is to provide an integrated process for the conversion of a normally gaseous hydrocarbon into normally liquid hydrocarbons.

Still a further object of this invention is to provide a single integrated process for the production of both oxygenated organic compounds and hydrocarbons as products of the process.

Another object of this invention is to provide a more economic process for the synthesis of organic compounds from methane.

Other objects and advantages of the present invention will become apparent to those skilled in the art from the accompanying description and disclosure.

According to this invention, methane, or other normally gaseous hydrocarbon or mixture thereof, is converted simultaneously in separate zones to hydrogen and carbon monoxide by partial combustion with an oxygen-containing gas as the primary reaction in one zone and by direct reaction with steam as the primary reaction in a second zone. The product of the methane conversion comprising hydrogen and carbon monoxide from each zone is combined as a synthesis feed mixture and passed through a synthesis reaction zone under suitable conditions of operation and in the presence of a suitable catalyst, such as iron to produce hydrocarbons having more than one carbon atom per molecule and oxygenated organic compounds as the principal products of the process. Unconverted reactants, carbon dioxide and methane from the synthesis reaction are recycled to one or both of the methane conversion zones. By effecting the synthesis of organic compounds according to this invention the efficiency of the process may be greatly increased and a synthesis feed gas of the desired composition for optimum yield of normally liquid organic compounds may be produced.

It is desirable to use a synthesis feed gas having a relatively high ratio of hydrogen to carbon monoxide, such as a mol ratio of about 2:1, since the use of a feed gas having a relatively low ratio of hydrogen to carbon monoxide increases undesirable side reactions which results in contaminating the synthesis catalyst with carbon, tars, waxes and relatively high-boiling organic compounds.

For the best understanding of the present invention a description of the process according to the accompanying drawings will be undertaken.

Fig. 1 of the drawings comprises a diagrammatic illustration of an arrangement of apparatus for the manufacture of hydrocarbons having more than one carbon atom per molecule and oxygenated organic compounds from methane in a single synthesis reaction unit. The apparatus of Fig. 1 comprises a methane combustion unit 7, a methane reforming unit 14, a synthesis reactor 21 and suitable auxiliary equipment.

Figure 2:
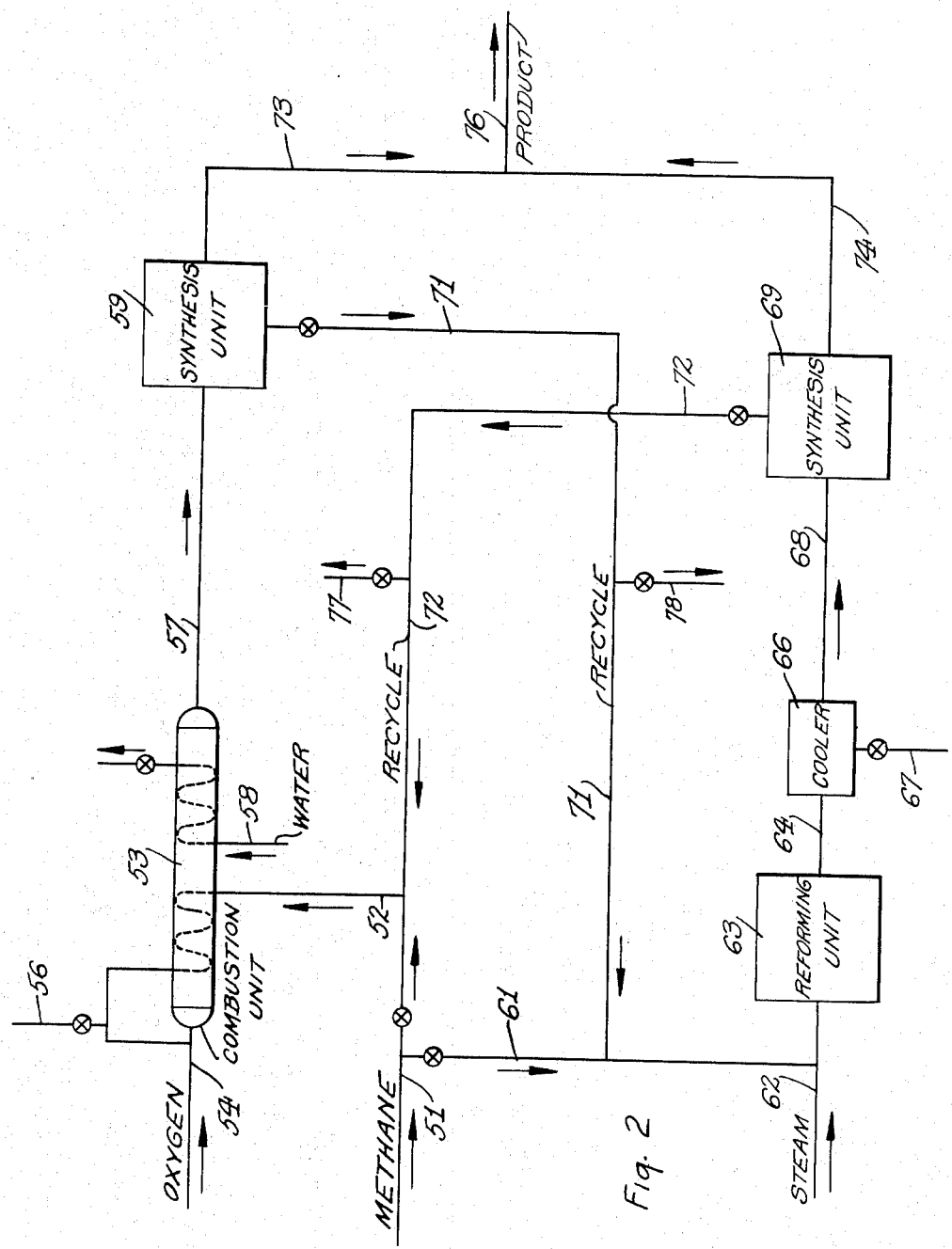

Fig. 2 is a modification of the present invention for the manufacture of organic compounds from methane in which the methane conversion products are converted to organic compounds in two synthesis reaction units.

According to the illustration of the present process of Fig. 1, methane or a methane-containing gas from any suitable source, such as natural gas, is passed under pressure through conduit 6 to a combustion zone 7. Although methane is referred to specifically as the feed, the use of other gaseous hydrocarbons, such as ethane and propane, is within the scope of this invention. Oxygen or an oxygen-containing gas is passed to combustion zone 7 through conduit 8. Methane is preheated, such as by indirect heat exchange with the combustion products from combustion zone 7 as shown. Oxygen may also be preheated if desired. In combustion zone 7, methane is oxidized to hydrogen and carbon monoxide according to the typical equation shown below.

$$CH_4 + 1/2 O_2 \rightarrow 2H_2 + CO$$

Combustion zone 7 may comprise a pressure vessel formed of a carbon steel shell capable of withstanding the pressure of operation and protected from excessive temperature by a cast lining of a suitable refractory material, such as zirconia, including a burner fabricated of a heat resistant alloy and cooled by circulating water or steam through it.

When the source of methane is natural gas, the feed gas composition will be approximately that shown in Table I below:

*Table I*

| | Mol percent |
|---|---|
| $N_2$ | 1.3 |
| $CO_2$ | 0.5 |
| $CH_4$ | 79.7 |
| $C_2H_6$ | 12.1 |
| $C_3H_8$ | 4.7 |
| $C_4H_{10}$ | 1.2 |
| $C_5+$ | 0.5 |
| | 100.0 |

The temperature of combustion zone 7 is between about 1700 and about 2600° F., preferably it is at a temperature of about 1800 to about 1900° F. when using a catalyst, such as nickel, and at a temperature of about 2350 to about 2500° F. when not using a catalyst. A pressure between about one atmosphere and about 500 pounds per square inch gage corresponding substantially to the pressure in the subsequent synthesis reaction zone is maintained in combustion zone 7. Preferably, the reaction is effected with a catalyst comprising nickel or nickel oxide supported on a heat resistant support as alundum. The catalyst is usually contained in a stationary bed in various forms, such as pellets or granules, porous tubes of ceramic material impregnated with catalyst, or tubes of the metal catalyst. The reaction is exothermic requiring only preheating of the methane stream to effect reaction. The mol ratio of oxygen to methane entering the reaction zone is between about 0.5:1 to about 0.70:1. A reaction effluent comprising hydrogen and carbon monoxide in a mol ratio of less than about 2:1 is continuously removed from reaction zone 7 through conduit 11. Since the temperature of reaction is a function of the ratio of oxygen to methane, a specific ratio within the above range is chosen to give the desired temperature at which conversion is substantially complete and carbon formation is minimized. The specific mol ratio of hydrogen to carbon monoxide in the product from combustion chamber 7 is between about 1.7:1 and about 1.8:1 when no tail gas is recycled from the synthesis reaction system and between about 1:1 and about 1.7:1 when tail gas including carbon dioxide is recycled. The composition of typical reaction effluents for the partial combustion of methane are shown below in Table II and it will be understood that such composition depends upon such operating conditions as temperature, ratio of methane and oxygen, etc.

*Table II* 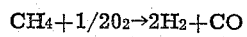

| | No Recycling | Recycling |
|---|---|---|
| $N_2$ mol percent | 1.8 | 4.1 |
| $H_2$ do | 59.6 | 52.8 |
| $CO$ do | 35.1 | 37.8 |
| $CO_2$ do | 2.8 | 3.5 |
| $CH_4$ do | 0.7 | 1.8 |
| Total (Dry Basis) | 100.0 | 100.0 |
| $H_2:CO$ Ratio | 1.7:1 | 1.4:1 |

Although substantially pure oxygen is preferred as the oxidizing agent for the methane combustion, air or other oxygen-containing gas may be used also without departing from the scope of this invention. In order to recover exothermic heat of reaction liberated in combustion zone 7, indirect heat exchange of the reaction products with water to produce steam may be effected in conduit 9 as shown. The steam thus produced may be used for producing power, for heating purposes or may be used in the reaction between methane and steam to be described more fully hereinafter.

Simultaneously, with the production of hydrogen and carbon monoxide in combustion unit 7, methane is continuously passed from conduit 6 through conduit 12 to reforming unit 14. Steam is introduced into reforming unit 14 through conduit 13. Heat is supplied to reforming unit 13 by the combustion of a fuel in indirect heat exchange with the mixture of steam and methane to produce a temperature between about 1400 and about 1600° F. Reforming unit 14 comprises a conventional tubular reforming furnace of the type known to those skilled in the art with catalyst in the reaction tubes. The pressure of the reaction mixtuer of methane and steam in the tubes of the reforming furnace 14 is below about 100 pounds per square inch gage and is preferably between about 15 and about 50 pounds per square inch. A ratio of steam to methane in the feed mixture to the reforming unit 14 is about 2 mols of steam per mol of methane, although higher ratios may be used without departing from the scope of this invention. Carbon dioxide may be employed to replace a portion of the steam used. For example, one mol of steam and one mol of carbon dioxide may be employed per mol of methane without departing from the scope of this invention. Typical equations for the reaction of methane with steam and carbon dioxide are shown below:

$$CH_4 + H_2O \rightarrow CO + 3H_2$$
$$CH_4 + CO_2 \rightarrow 2CO + 2H_2$$

The interaction of methane with steam or carbon dioxide is effected in the presence of a suitable catalyst in reforming unit 14. A suitable reforming catalyst may comprise nickel or nickel oxide supported on alumina or other supporting material, such as, for example, a catalyst containing in parts by weight 1NiO, 0.2Cr$_2$O$_3$, 1.6SiO$_2$, 0.9MgO. Other reforming catalysts comprise molybdenum, cobalt and chromium and their oxides and sulfides. The catalyst is contained in a stationary bed of granular material in the tubes. A regenerative type reformer furnace constructed of ceramic material may be used instead of the aforementioned tubular type furnace. With a regenerative type furnace, temperatures as high as 2400° F. are possible thus obviating the necessity of a catalyst. A gaseous effluent comprising hydrogen and carbon monoxide in a mol ratio greater than about 2:1, usually about 4:1 with no recycle of tail gas, is removed from reforming unit 14 through conduit 16. Such a gaseous effluent has approximately a composition as shown in Table III below when natural gas is the source of methane. It will be understood that the composition of the effluent will depend upon the reforming operating conditions, such as temperature, space velocity, steam to methane ratio, etc.

*Table III*

|  | Mol per cent |
|---|---|
| N$_2$ | 0.3 |
| H$_2$ | 73.5 |
| CO | 18.1 |
| CO$_2$ | 6.3 |
| CH$_4$ | 1.8 |
| Total (dry basis) | 100.0 |

The effluent in conduit 16 is passed through a cooler 17 for cooling the effluent to a temperature below about 100° F. to condense the steam in the effluent, which steam is removed as condensate from cooler 17 through conduit 15. Usually the temperature of the effluent is cooled to about 100° F. before compressing. From cooler 17 the reforming unit effluent is continuously passed through conduit 18 and compressed if necessary (not shown) to be combined with the effluent of combustion unit 7 in conduit 11. The resulting mixture from conversion units 7 and 14 is continuously passed through conduit 19 to a conventional synthesis reactor 21.

Synthesis reactor 21 may comprise any of several types of conventional reaction chambers, such as fixed bed or fluid bed reaction units, known to those skilled in the art, and may comprise several reactors in series or in parallel. The combined synthesis feed in conduit 19 comprises hydrogen and carbon monoxide in a mol ratio of about 2:1. This feed is passed through synthesis reactor 21 in contact with a suitable catalyst, such as iron or other metal or metal oxide of group VIII of the periodic table, under conditions of reaction such that hydrocarbons having more than one carbon atom per molecule and oxygenated organic compounds are produced as products of the process. The temperature of reaction in synthesis reactor 21 is usually between about 300 and about 700° F. and a pressure is maintained between about atmospheric and about 500 pounds per square inch gage, preferably between about 100 and about 300 pounds per square inch gage. When employing an iron or iron oxide catalyst, a temperature between about 450 and about 650° F. is appropriate. When employing a cobalt catalyst a temperature below 450° F. is employed. Sufficient contact time between reactants and reaction products with the catalytic material is afforded in reactor 21 to produce the desired product of the process. Usually, a contact time of gases and catalyst between about 2 and 20 seconds is appropriate.

A reaction effluent comprising hydrocarbons, oxygenated organic compounds, steam and unreacted reactants including some methane, is removed from reactor 21 through conduit 22 and passed to a primary condensation unit 23. Condensation unit 23 comprises a conventional condenser and accumulator and auxiliary equipment for partial condensation of the effluent. Unit 23 may comprise a single or a series of condensation units and accumulators. The temperature of the effluent in condensation unit 23 is reduced to about 300° F. or lower but the effluent in condensation unit 23 is maintained at substantially the same pressure as that existing in reactor 21. The cooling of the effluent results in the formation of two liquid phases in primary condensation unit 23. These liquid phases comprise a lighter hydrocarbon-rich phase and a heavier aqueous-rich phase containing dissolved oxygenated organic compounds. Gases comprising hydrogen and/or carbon monoxide and including some methane and carbon dioxide are removed from condensation unit 23 through conduit 24 and may be recycled to synthesis reactor 21 through conduit 26 in order to supplement the composition as to any component of the synthesis feed in conduit 19 and to alter the ratio of hydrogen to carbon monoxide in reactor 21. The aqueous-rich phase in primary condensation unit 23 is removed therefrom through conduit 27 and may be passed to subsequent conventional separation and recovery equipment (not shown) for the removal of dissolved oxygenated organic compounds therefrom as products of the process.

A portion of all of the uncondensed components of the effluent from reactor 21 and the liquid hydrocarbon-rich phase are removed from condensation unit 23 through conduit 28 and passed to a secondary condensation unit 29 which may comprise a lean oil circulating system. Condensation unit 29 may also comprise suitable condensers and accumulators for further condensation and accumulation of reaction products. The temperature of condensation unit 29 is maintained below about 100° F. and a pressure is maintained substantially equivalent to the pressure existing in synthesis reactor 21. Pressures higher than the pressures existing in reactor 21 and condenser 23 and refrigeration may be employed in connection with unit 29 without departing from the scope of this invention. In condensation unit 29 further condensation of the gaseous components is effected and the liquid hydrocarbon condensate is removed therefrom through conduit 31 and passed to subsequent conventional separation and recovery equipment (not shown) for the recovery of products of the process. Any water condensed in condensation unit 29 is withdrawn therefrom through conduit 32. Uncondensed components of the reaction effluent comprising hydrogen and/or carbon monoxide, carbon dioxide, methane and unrecovered hydrocarbons heavier than methane, are removed from condensation unit 29 through conduit 33 and are recycled in whole or in part to conduit 6 and combustion unit 7 by means of a recycle conduit 34. A portion or all of the gases or vapors from the primary condensation unit 23 may also be recycled to combustion unit 7 through conduits 24, 34 and 6. Recycling of gases from condensation units 23 and 29 to combustion unit 7 is desirable in order to utilize the relatively high pressure existing on the gases. This pressure is substantially the same as the pressure existing in synthesis reactor 21 which is usually under a pressure substantially the same as that in combustion unit 7, except for the additional pressure needed for the pressure drop required for flow through the system. If the pressure in combustion unit 7 is lower than that of the recycled gases, the pressure may be decreased by expansion into conduit 6 in which case compression will be effected in conduit 11 or 19 by means not shown. However, if the pressure of the recycle gases is lower than the pressure existing in combustion unit 7, a suitable compressor (not shown) must be provided for raising the pressure of the recycle gases to the pressure existing in combustion unit 7. Preferably, combustion unit 7 is operated at substantially the same pressure as synthesis reactor 21 with no compression of the combustion unit effluent and in this manner of operation only a relatively small amount of compression of the recycled gases is necessary.

Alternatively, the recycled gases from condensation units 23 and 29 may be passed in whole or in part to reforming unit 14 through conduits 34 and 41 without departing from the scope of this invention although recycling to reformer 14 is not as desirable in most instances as recycling to unit 7. Recycling of at least a portion of the recycle gases to reforming unit 14 is particularly desirable when the synthesis reaction is effected in the presence of an iron or an iron oxide catalyst since with such a catalyst the synthesis reaction effluent contains appreciable amounts of carbon dioxide. With a reduced iron catalyst the composition of synthesis reaction effluent may comprise as much as 20 to 50 per cent carbon dioxide. As previously discussed, carbon dioxide reacts with methane and, therefore, recycling of the carbon dioxide-rich gases to reforming unit 14 is particularly desirable and results in a higher methane conversion at given conditions and in a lower endothermic reaction duty per unit of carbon monoxide manufactured as compared with the use of steam and methane alone.

The recycled gases in conduit 34 may be passed in entirety to either combustion unit 7 or to reforming unit 14 as will be most efficient and economical under conditions of operation, or the recycling gases in conduit 34 may be divided and a portion passed to combustion unit 7 and the other portion passed to reforming unit 14.

A typical composition of recycle gases is illustrated in Table IV below when using an iron synthesis catalyst.

Table IV

|      | Mol per cent |
|------|-------------:|
| N₂   | 2.4 |
| H₂   | 47.4 |
| CO   | 6.3 |
| CO₂  | 32.3 |
| CH₄  | 8.5 |
| C₂+  | 3.1 |
| Total | 100.0 |

As is evident from the above typical composition a considerable amount of hydrogen and combined carbon is present in the recycle gases. The presence of such components is a readily available source of synthesis feed gas (CO+H₂) and, thus, the recycle of the normally gaseous components of the synthesis effluent to the methane conversion units is desirable. The hydrogen in the recycle gases is not only a source of hydrogen for the synthesis reaction, but is known to decrease carbon or coke formation during partial combustion of methane, such as is effected in combustion unit 7.

In order to prevent the build-up of nitrogen in the system, particularly when using air as a source of oxygen for combustion unit 7, a portion of the recycle gases is continuously or intermittently passed to a carbon dioxide absorption unit 36 through conduits 24 and 37 or conduit 33. In absorption unit 36 the gases are contacted with a suitable solvent for the removal of carbon dioxide therefrom in the conventional manner. Such solvents may comprise monoethanolamine or other ethanol amines. Nitrogen and other unabsorbed gases, such as methane, are removed from absorption unit 36 through conduit 38 and vented to the atmosphere or used as fuel. Carbon dioxide is recovered from the rich solvent by stripping, by reducing the total or partial pressure, or by heating, and then the resulting lean solvent is returned for the absorption of more carbon dioxide. The desorbed carbon dioxide is removed from absorption unit 36 through conduit 39 and returned to recycle conduit 34 for return to either combustion unit 7 or reforming unit 14.

With regard to stripping the rich solvent of absorption unit 36 by reduction of the partial pressure, as a modification of this invention the rich solvent containing dissolved carbon dioxide therein is contacted countercurrently with the methane feed stream from conduits 6 or 12 and, as the result of the reduced partial pressure of carbon dioxide during contact with the methane stream, the carbon dioxide is desorbed. A methane stream containing the desorbed carbon dioxide is then passed to either or both of methane conversion units 7 and 14, as desired. By this method of desorbing carbon dioxide from the rich solvent, the necessity of heating the rich solvent is obviated or at least minimized and the carbon dioxide is converted to carbon monoxide in the methane conversion zones, particularly in reforming unit 14.

Fig. 2 comprises a diagrammatic arrangement of apparatus illustrating a modification of the present invention in which two synthesis reaction units are employed rather than the single synthesis reaction unit of Fig. 1. For the best understanding of this modification, a description thereof will be undertaken in accordance with the arrangement of apparatus of Fig. 2. In Fig. 2, methane, natural gas or other relatively low-boiling hydrocarbons are continuously passed through conduit 51 by means of a compressor (not shown), if necessary, to conduit 52 and thence in indirect heat exchange with the reaction products of a combustion unit 53 to the inlet of combustion unit 53. Oxygen is combined with the inlet methane stream by means of conduit 54 and the resulting mixture is burned under conditions of partial combustion in combustion unit 53 under similar conditions and in a similar manner as described in Fig. 1. The preheated methane stream may be combined with steam injected therein through conduit 56, if desired, in order to minimize the formation of carbon and increase the conversion of methane. The temperature of combustion unit 53 is usually above 1800° F. and in order to recover at least a portion of the exothermic heat of the reaction, water may be passed in indirect heat exchange through conduit 58 with combustion unit 53 to produce steam which may be used for heating purposes, for compression purposes or for use in the reaction between steam and methane. A gaseous effluent comprising hydrogen and carbon monoxide in a mol ratio less than about 2:1, usually about 1:1 when tail gas is recycled from the synthesis reaction, is removed from combustion unit 53 through conduit 57 and is passed to a conventional synthesis reaction unit 59.

Synthesis reaction unit 59 comprises a conventional stationary or fixed bed reactor or a conventional fluid bed reactor with suitable auxiliary equipment combined therewith known to those skilled in the art. Synthesis reaction unit 59 may comprise a plurality of reactors in series or in parallel. The reaction conditions of operation will depend upon the product desired and upon the particular catalyst used and will usually be within the aforesaid conditions of operation with respect to synthesis unit 21 of Fig. 1, except with regard to changes necessitated by the change in composition of the synthesis feed. Since the reaction effluent has a relatively low ratio of hydrogen to carbon monoxide therein, the most suitable catalyst for such low ratios is iron and thus this catalyst is preferred. However, other conventional synthesis catalysts, such as cobalt or nickel, may be used in synthesis unit 59 without departing from the scope of this invention.

Synthesis unit 59 comprises, in addition to a reactor, suitable condensation and separation equipment for separating normally gaseous components, such as unreacted reactants, and normally liquid products of the process from the reaction effluent as shown in Fig. 1 and previously described. A gaseous mixture comprising unreacted hydrogen and/or carbon monoxide, carbon dioxide and methane, is removed from unit 59 through conduit 71 corresponding to either conduit 24 or 33 of Fig. 1. Since the synthesis feed to the synthesis unit 59 has a relatively low mol ratio of hydrogen to carbon monoxide, usually below about 2:1, the reaction effluent will contain a relatively small proportion of hydrogen and will be rich in carbon dioxide, especially when an iron catalyst is used. An analysis of a typical recycle gas in conduit 71 is shown in Table V below:

*Table V*

| | Mol per cent |
|---|---|
| $N_2$ | 3.3 |
| $H_2$ | 28.1 |
| $CO$ | 11.4 |
| $CO_2$ | 47.6 |
| $CH_4$ | 6.1 |
| $C_2+$ | 3.5 |

Such a composition of recycle gas of course depends on such operating conditions of synthesis unit 59, as temperature, pressure, catalyst, space velocity, composition of feed gas, etc. According to this modification, the gases are passed through conduits 71 and 61 to a reforming unit 63 in a similar manner and for similar reasons as described with regard to the recycling of a high carbon dioxide content recycle gas to reforming unit 14 of Fig. 1. It is desirable in this particular instance when there is a relatively low concentration of hydrogen and carbon monoxide and a relatively high concentration of carbon dioxide in the recycle gases in conduit 71 not to recycle such gases to combustion unit 53 because carbon dioxide requires additional oxygen and lowers the hydrogen to carbon monoxide ratio of the product gas. Normally liquid hydrocarbons and oxygenated organic compounds are withdrawn from synthesis unit 59 through conduit 73 and passed through conduit 76 to conventional purification and recovery units (not shown) for the recovery of products of the process.

Simultaneously, with the partial oxidation of methane in combustion unit 53 reforming of methane is being effected in a reforming unit 63. Consequently, methane is continuously passed from conduit 51 through conduit 61 to reforming unit 63 and steam from conduit 62 is admixed with the methane stream in reforming unit 63 to effect the reaction between steam and methane to produce hydrogen and carbon monoxide. The operation of reforming unit 63 is similar to the operation of reforming unit 14 of Fig. 1 and, therefore, the operating conditions, the construction of the reforming unit and the manner of operation need not be discussed in detail here. The reforming operation is effected at a temperature between about 1400 and about 1600° F. in the presence of a catalyst by the indirect heating of the methane-steam mixture in tubes of a conventional reforming furnace 63. A reaction effluent comprising hydrogen and carbon monoxide in a mol ratio greater than about 2:1 is removed from reforming unit 63 through conduit 64 and is passed through a cooler 66 in which steam is condensed from the effluent and removed therefrom through conduit 67. The reaction effluent is cooled by cooler 66 to a temperature below about 100° F. From cooler 66 the cooled effluent is passed, with or without compression and/or preheating (not shown), through conduit 68 to a conventional synthesis reaction unit 69 comprising either a conventional fixed or fluid bed reactor, suitable auxiliary equipment and conventional condensation and accumulating units for the separation of products of reaction and normally gaseous components of the effluent. The catalyst in synthesis reaction unit 69 may be any of the various conventional hydrogenating catalysts for the production of hydrocarbons and oxygenated organic compounds, such as iron, cobalt and nickel. The synthesis reaction conditions are substantially the same as those described with respect to synthesis reactor 21 of Fig. 1 and synthesis unit 59 of Fig. 2. Since the synthesis feed comprises hydrogen and carbon monoxide at a ratio greater than about 2:1, a conventional and suitable catalyst in this step comprises cobalt. A cobalt catalyst may be advantageously employed in synthesis unit 69 because cobalt is characterized for its use with a molar feed ratio of hydrogen to carbon monoxide between about 2:1 to 3:1. An iron catalyst, particularly a low alkali iron catalyst, can be used and is preferable in some instances.

Since reforming unit 63 is operated at relatively low pressures below about 100 pounds per square inch gage, synthesis unit 69 can be operated at relatively low pressures and may be operated at pressures as low as 100 pounds per square inch gage or lower, especially when using a cobalt catalyst. The operation of unit 69 at low pressures eliminates the necessity of compressing the effluent from reforming unit 63. Nevertheless, synthesis unit may be operated at pressures as high as 500 pounds per square inch gage without departing from the scope of this invention.

Recycle gases are withdrawn from synthesis unit 69 through conduit 72 which corresponds to either conduit 24 or conduit 33 of Fig. 1. Recycle gases from synthesis unit 69 contain a relatively high concentration of hydrogen and a relatively low concentration of carbon dioxide because the original synthesis feed to that unit contains a relatively high ratio of hydrogen to carbon monoxide. A typical recycle gas composition passing through conduit 72 is shown in Table VI below which composition depends upon the operating conditions existing in synthesis unit 69.

*Table VI*

| | Mol percent |
|---|---|
| $N_2$ | 2.7 |
| $H_2$ | 73.5 |
| CO | 5.4 |
| $CO_2$ | 9.7 |
| $CH_4$ | 6.8 |
| $C_2+$ | 1.9 |
| Total | 100.0 |

Since the recycle gases in conduit 72 have such a composition, it is very desirable on account of their high pressure and the presence of hydrogen and methane to recycle these gases to combustion unit 53 through conduits 72 and 52 as previously described with regard to Fig. 1. The presence of hydrogen in combustion unit 53 shifts the production of carbon dioxide to the production of carbon monoxide and results in a greater volume of hydrogen in the reaction effluent from combustion unit 53. Products of the process are withdrawn from synthesis unit 69 through conduit 74 and are combined with the products of the process in conduit 73 and are passed through conduit 76 to conventional purification and recovery units (not shown).

In the event synthesis unit 69 is operated at a pressure below the pressure existing in combustion unit 53, a compressor (not shown) is provided in conduit 72 for compressing the recycle gases to the inlet pressure of combustion unit 53. Compression of the gases in conduit 72 instead of in conduit 68 reduces the compression costs because the quantity of gases to be compressed is less.

A portion of the recycled gases in conduits 71 and 72 may be vented through conduits 77 and/or 78, in order to prevent the build-up of inert gases, such as nitrogen, in the system. The gases from conduits 77 and 78 may be vented to the atmosphere or used as fuel, or passed through a carbon dioxide absorption unit similar to unit 36 of Fig. 1, and the carbon dioxide recovered and recycled to either or both of conduits 71 and 72, preferably to conduit 71.

Since relatively low ratios of $H_2$:CO are conducive to $CO_2$ formation rather than water formation, synthesis unit 59 of Fig. 2 can be conveniently operated with a high alkali iron catalyst (1.0 to 2.0% alkali) to produce water soluble oxygenated organic compounds, such as alcohols, acids, etc. The small quantity of water produced decreases the cost of recovery of the water soluble chemicals from the water. In combination with the production of oxygenated compounds in synthesis unit 59, unit 69 is advantageously operated to produce the maximum yield of hydrocarbons, such as by use of a low alkali iron catalyst or a cobalt catalyst. The combination of chemical production in unit 59 and hydrocarbon production in unit 69 results in a well-balanced process since it provides a source of gasoline and chemicals from a single integrated process.

Another single integrated process for the production of gasoline and diesel fuel is provided by the present invention when a low alkali iron catalyst is used in the low ratio $H_2$:CO unit 59 and a cobalt catalyst is used in the high ratio $H_2$:CO unit 69. The low alkali iron catalyst produces a high yield of gasoline motor fuel and the cobalt catalyst produces a high yield of diesel fuel. Of course, various operating conditions characteristic for each catalyst and product, which are known to those skilled in the art, may be employed.

It is within the scope of this invention to recycle a portion of the recycle gases directly to the synthesis reaction zones of Fig. 2. Recycle gases in conduit 71 may be divided and a portion passed directly to synthesis unit 69, the recycle gases being prepared by any of the methods described with regard to Fig. 1. Additionally or alternatively to the above, a portion of the recycle gases in conduit 72 can be recycled directly to synthesis unit 59.

Certain valves, coolers, heaters, accumulators, distillation columns, pumps, etc. have been omitted from the drawings as a matter of convenience and their use and location will become obvious to those skilled in the art. The length of certain conduits of Figs. 1 and 2 of the drawing are not proportional to the distance travelled but are merely diagrammatical. It is not intended to limit any particular location of inlets and outlets as shown in the drawings. The examples of composition of gases and theory in connection with this invention are offered as illustration and should not be construed to be unnecessarily limiting to the invention.

Various modifications and alterations of the present invention may become apparent to those skilled in the art without departing from the scope of this invention. For example, conversion of coal or coke with steam and oxygen may be substituted for the partial combustion of methane in unit 53 to produce a synthesis feed gas of a relatively low ratio of hydrogen to carbon monoxide. Moreover, it may be necessary to remove $H_2S$ from the feed stream in conduit 51 when the feed is natural gas in order to prevent injury to the catalysts and equipment.

I claim:

1. An improved process for producing organic compounds from normally gaseous hydrocarbons which comprises reacting a carbonaceous feed with oxygen in a first conversion zone under conditions to produce the gaseous effluent comprising hydrogen and oxides of carbon in a mol ratio less than about 2:1, passing said gaseous effluent from said first conversion zone to a first synthesis reaction zone under conditions such that hydrogen and an oxide of carbon are converted to organic compounds, simultaneously reacting a normally gaseous hydrocarbon with steam in a second conversion zone under conditions to produce a gaseous effluent comprising hydrogen and oxides of carbon in a mol ratio greater than about 2:1, passing said effluent from said second conversion zone to a second synthesis reaction zone under conditions such that hydrogen and an oxide of carbon are converted to organic compounds, recycling normally gaseous components of the effluent from said first synthesis reaction zone to said second conversion zone, and recycling normally gaseous compounds from said second synthesis reaction zone to said first conversion zone.

2. An improved integrated process for producing organic compounds from a normally gaseous hydrocarbon which comprises reacting a normally gaseous hydrocarbon with oxygen in a combustion zone at a temperature between about 1700 and about 2600 degrees Fahrenheit and at a pressure between about atmospheric and about 500 pounds per square inch gage to produce a gaseous effluent comprising hydrogen and carbon monoxide in a mol ratio less than about 2:1, passing said effluent from said combustion zone to a first synthesis reaction zone, maintaining said first synthesis reaction zone at a temperature between about 300 and about 700 degrees Fahrenheit and at a pressure between about atmospheric and at about 500 pounds per square inch gage, contacting the effluent from said combustion zone in said synthesis reaction zone with catalyst to produce a gaseous effluent comprising organic compounds as products of the process and a relatively large proportion of carbon dioxide, separating normally gaseous compounds from said effluent of said first synthesis reaction zone, simultaneously reacting a normally gaseous hydrocarbon with steam in a reforming zone at a temperature between about 1250 and about 2400 degrees Fahrenheit and a pressure below about 100 pounds per square inch gage to produce a gaseous effluent comprising hydrogen and carbon monoxide in a mol ratio greater than about 2:1, passing said effluent from said reforming zone to a second synthesis reaction zone in contact with a catalyst therein, maintaining a temperature of reaction in said second synthesis reaction zone between about 300 and about 450 degrees Fahrenheit to produce an effluent comprising organic compounds, hydrogen and a relatively small proportion of carbon dioxide, separating normally gaseous compounds from said effluent from said second synthesis reaction zone, recycling normally gaseous components of the effluent from said first synthesis reaction zone to said reforming zone, recycling normally gaseous components of the effluent from said second synthesis reaction zone to said combustion zone, and recovering said organic compounds produced in said synthesis reaction zones as products of the process.

3. An improved integrated process for producing organic compounds from a normally gaseous hydrocarbon which comprises reacting a normally gaseous hydrocarbon with oxygen in a combustion zone at a temperature between about 1700 and about 2600 degrees Fahrenheit and at a pressure between atmospheric and about 500 pounds per square inch gage to produce a gaseous effluent comprising hydrogen and carbon monoxide in a mol ratio less than about 2:1, passing said effluent from said combustion zone to a first synthesis reaction zone, maintaining said first synthesis reaction zone at a temperature between about 300 and about 700 degrees Fahrenheit and at a pressure between atmospheric and at about 500 pounds per square inch gage corresponding approximately to the pressure existing in said combustion zone, contacting the effluent from said combustion zone in said synthesis reaction zone with catalyst comprising iron to produce a gaseous effluent comprising organic compounds as products of the process and a relatively large proportion of carbon dioxide, separating normally gaseous compounds from said effluent of said first synthesis reaction zone, simultaneously reacting a normally gaseous hydrocarbon with steam in a reforming zone at a temperature between about 1250 and about 2400 degrees Fahrenheit and a pressure below about 100 pounds per square inch gage to produce a gaseous effluent comprising hydrogen and carbon monoxide in a mol ratio greater than about 2:1, passing said effluent from said reforming zone to a second synthesis reaction zone in contact with a catalyst comprising cobalt therein, maintaining a temperature of reaction in said second synthesis reaction zone between about 300 and about 450 degrees Fahrenheit and a relatively low pressure corresponding approximately to the pressure prevailing in said reforming zone to produce an effluent comprising organic compounds, hydrogen and a relatively small proportion of carbon dioxide, separating normally gaseous compounds from said effluent from said second synthesis reaction zone, recycling normally gaseous compounds from said first synthesis reaction zone to said reforming zone, recycling normally gaseous compounds from said second synthesis reaction zone to said combustion zone, and recovering said organic compounds produced in said synthesis reaction zones as products of the process.

4. An improved integrated process for the simultaneous production of oxygenated organic compounds and hydrocarbons which comprises reacting a normally gaseous hydrocarbon with oxygen in a combustion zone under conditions such that a gaseous effluent comprising hydrogen and carbon monoxide in a mol ratio less than about 2:1 is produced, passing said effluent from said combustion zone to a first synthesis reaction zone wherein hydrogen and carbon monoxide are converted to oxygenated organic compounds, contacting said effluent from said combustion zone with a high alkali iron catalyst in said first synthesis reaction zone under conditions such that a relatively high yield of oxygenated organic compounds are produced, separating normally gaseous compounds including a relatively large proportion of carbon dioxide from said first synthesis reaction zone, simultaneously reacting a normally gaseous hydrocarbon with steam in a reforming zone under conditions such that an effluent comprising hydrogen and carbon monoxide in a mol ratio greater than about 2:1 is produced, passing said effluent from said reforming zone to a second synthesis reaction zone wherein hydrogen and carbon monoxide are converted to hydrocarbons, contacting said effluent from said reforming zone in said second synthesis reaction zone with a low alkali iron catalyst under conditions such that hydrocarbons are produced in a relatively large yield, separating normally gaseous compounds including a relatively large proportion of hydrogen from said second synthesis reaction zone, recycling the normally gaseous compounds from said first synthesis reaction zone to said reforming zone, recycling the normally gaseous compounds from said second synthesis reaction zone to said combustion zone, and recovering said oxygenated organic compounds and hydrocarbons produced in said synthesis reaction zones as products of the process.

5. An improved integrated process for the simultaneous production of gasoline and diesel fuel which comprises reacting a normally gaseous hydrocarbon with oxygen in a combustion zone under conditions to produce a gaseous effluent comprising hydrogen and carbon monoxide in a mol ratio less than about 2:1, passing said effluent from said combustion zone to a first synthesis reaction zone in contact with a low alkali iron catalyst, maintaining said first synthesis reaction zone under conditions such that hydrogen and carbon monoxide are converted to gasoline quality hydrocarbons in the presence of said low alkali iron catalyst, separating the normally gaseous compounds from said first synthesis reaction zone, simultaneously reacting a normally gaseous hydrocarbon with steam in a reforming zone under conditions to produce a gaseous effluent comprising hydrogen and carbon monoxide in a mol ratio greater than about 2:1, passing said effluent from said reforming zone to a second synthesis reaction zone in contact with a catalyst comprising cobalt, maintaining said second synthesis reaction zone under conditions such that diesel fuel quality hydrocarbons are produced in the presence of said cobalt catalyst, separating normally gaseous compounds from said second synthesis reaction zone, recycling normally gaseous compounds from said first synthesis reaction zone to said reforming zone, recycling normally gaseous compounds from said second synthesis reaction zone to said combustion zone, and recovering said gasoline quality and diesel fuel quality hydrocarbons as products of the process.

6. An improved integrated process for the simultaneous production of oxygenated organic compounds and hydrocarbons which comprises reacting a normally gaseous hydrocarbon with oxygen in a combustion zone under conditions such that a gaseous effluent comprising hydrogen and carbon monoxide in a mol ratio less than about 2:1 is produced, passing said effluent from said combustion zone to a first synthesis reaction zone wherein hydrogen and carbon monoxide are converted to oxygenated organic compounds, contacting said effluent from said combustion zone with a high alkali iron catalyst in said first synthesis reaction zone under conditions such that a relatively high yield of oxygenated organic compounds are produced, separating normally gaseous components including a relatively large proportion of carbon dioxide from the effluent of said first synthesis reaction zone, simultaneously reacting a normally gaseous hydrocarbon with steam in a reforming zone under conditions such that an effluent comprising hydrogen and carbon monoxide in a mol ratio greater than about 2:1 is produced, passing said effluent from said reforming zone to a second synthesis reaction zone wherein hydrogen and carbon monoxide are converted to hydrocarbons, contacting said effluent from said reforming zone in said second synthesis reaction zone with a cobalt catalyst under conditions such that hydrocarbons are produced in a relatively large yield, separating normally gaseous components including a relatively large proportion of hydrogen from the effluent of said second synthesis reaction zone, recycling the normally gaseous components from said first synthesis reaction zone effluent to said reforming zone, recycling the normally gaseous components from said second synthesis reaction zone effluent to said combustion zone, and recovering said oxygenated organic compounds and hydrocarbons produced in said synthesis reaction zones as products of the process.

7. An improved integrated process for producing organic compounds from methane which comprises reacting methane with oxygen in the presence of a nickel-containing catalyst in a combustion zone at a temperature between about 1800 and about 1900 degrees Fahrenheit and at a pressure between atmospheric and about 500 pounds per square inch gage to produce a gaseous effluent comprising hydrogen and carbon monoxide in a mol ratio less than about 2:1, passing said effluent from said combustion zone to a first synthesis reaction zone, maintaining said first synthesis reaction zone at a temperature between about 450 and about 650 degrees Fahrenheit and at a pressure between atmospheric and at about 500 pounds per square inch gage corresponding approximately to the pressure existing in said combustion zone, contacting the effluent from said combustion zone in said synthesis reaction zone with catalyst comprising iron to produce a gaseous effluent comprising organic compounds as products of the process and a relatively large proportion of carbon dioxide, separating normally gaseous compounds from said effluent of said first synthesis reaction zone, simultaneously reacting methane with steam in the presence of a reforming catalyst in a reforming zone at a temperature between about 1400 and about 1600 degrees Fahrenheit and a pressure below about 100 pounds per square inch gage to produce a gaseous effluent comprising hydrogen and carbon monoxide in a mol ratio greater than about 2:1, passing said effluent from said reforming zone to a second synthesis reaction zone in contact with a catalyst comprising cobalt therein, maintaining a temperature of reaction in said second synthesis reaction zone between about 300 and about 450 degrees Fahrenheit and a relatively low pressure corresponding approximately to the pressure prevailing in said reforming zone to produce an effluent comprising organic compounds, hydrogen and a relatively small proportion of carbon dioxide, separating normally gaseous compounds from said effluent from said second synthesis reaction zone, recycling normally gaseous compounds from said first synthesis reaction zone to said reforming zone, recycling normally gaseous compounds from said second synthesis reaction zone to said combustion zone, and recovering said organic compounds produced in said synthesis reaction zones as products of the process.

8. In the process wherein gases comprising carbon monoxide and hydrogen in hydrocarbon synthesis proportions are generated in a synthesis gas generation zone, and wherein said gases are reacted under hydrocarbon synthesis conditions in the presence of an iron type hydrocarbon synthesis catalyst in a hydrocarbon synthesis reaction zone, and wherein the gaseous reaction product of the reaction between hydrogen and carbon monoxide comprises carbon dioxide, the steps comprising scrubbing at least a portion of said gaseous reaction product with a solvent for carbon dioxide, countercurrently contacting the solution thus obtained with natural gas as a stripping gas whereby carbon dioxide is stripped from said solution, passing at least a portion of said stripping gas containing stripped carbon dioxide to said process and converting said stripping gas and said carbon dioxide in said process.

9. In the process wherein gases comprising carbon monoxide and hydrogen in hydrocarbon synthesis proportions are generated in a synthesis gas generation zone, and wherein said gases are reacted under hydrocarbon synthesis conditions in the presence of an iron type hydrocarbon synthesis catalyst in a hydrocarbon synthesis reaction zone, and wherein the gaseous reaction product of the reaction between hydrogen and carbon monoxide comprises carbon dioxide, the steps comprising scrubbing at least a portion of said gaseous reaction product with a solvent for carbon dioxide, contacting the solution thus obtained with natural gas as a stripping gas whereby carbon dioxide is stripped from said solution, passing at least a portion of said stripping gas containing stripped carbon dioxide to said process and converting said stripping gas and said carbon dioxide in said process.

References Cited in the file of this patent

UNITED STATES PATENTS

| Number | Name | Date |
|---|---|---|
| 2,253,607 | Boyd et al. | Aug. 26, 1941 |
| 2,324,172 | Parkhurst | July 13, 1943 |
| 2,460,508 | Johnson et al. | Feb. 1, 1949 |

FOREIGN PATENTS

| Number | Country | Date |
|---|---|---|
| 581,174 | Great Britain | Oct. 3, 1946 |